United States Patent [19]

Budney

[11] Patent Number: 5,426,620
[45] Date of Patent: Jun. 20, 1995

[54] METHOD FOR CONTROLLING AND MANAGING LOAD DEMAND

[76] Inventor: Stanley M. Budney, 8069 Rowan Rd., Mars, Pa. 16046

[21] Appl. No.: 763,490

[22] Filed: Sep. 23, 1991

Related U.S. Application Data

[63] Continuation of Ser. No. 571,140, Aug. 23, 1990, abandoned, which is a continuation-in-part of Ser. No. 316,541, Feb. 28, 1989, abandoned, which is a continuation of Ser. No. 29,245, Mar. 23, 1987, abandoned.

[51] Int. Cl.$^6$ .................. G04B 47/00; G01F 8/00; H01H 7/00; H01H 43/00
[52] U.S. Cl. .................. 368/10; 368/108; 307/35; 307/39; 307/141.4
[58] Field of Search .................. 368/10, 107–113; 307/35, 39, 40, 52, 141, 141.4; 315/159; 361/22

[56] References Cited

U.S. PATENT DOCUMENTS

| | | | |
|---|---|---|---|
| 3,939,361 | 2/1976 | Aidala et al. | 307/141 |
| 3,940,660 | 2/1976 | Edwards | 307/141 |
| 4,125,782 | 11/1978 | Pollnow | 307/35 |
| 4,141,069 | 2/1979 | Fox | 307/52 |
| 4,141,407 | 2/1979 | Briscoe et al. | 307/35 |
| 4,151,426 | 4/1979 | Price | 307/141 |
| 4,151,515 | 4/1979 | Pease et al. | 307/141 |
| 4,180,744 | 12/1979 | Helwig, Jr. | 307/35 |
| 4,209,728 | 6/1980 | Membreno | 307/141 |
| 4,213,058 | 7/1980 | Townsend | 307/40 |
| 4,283,635 | 8/1981 | Balmer | 307/35 |
| 4,292,543 | 9/1981 | Reed, Sr. | 307/35 |
| 4,362,970 | 12/1982 | Grady | 307/141.4 |
| 4,415,943 | 11/1983 | Wortman | 361/22 |
| 4,451,763 | 5/1984 | Sodini | 315/159 |
| 4,465,965 | 8/1984 | Chernotsky et al. | 307/35 |
| 4,475,076 | 10/1984 | Chernotsky et al. | 307/35 |
| 4,549,274 | 10/1985 | Lerner et al. | 307/39 |

OTHER PUBLICATIONS

O.E.M. Catalog, SSCA Inc. Baldwinsville, N.Y. 13027, Aug. 1, 1987, pp. B2–B4 & B105–B106.

*Primary Examiner*—Vit W. Miska
*Attorney, Agent, or Firm*—Richard C. Litman

[57] ABSTRACT

A load demand and operation control and management process for controlling diverse operation and individual electrical requirement of any load or loads of energy-consuming equipment, the process utilizing process apparatus which optimizes the performance of the equipment while precisely controlling and synchronizing the demand of its individual load requirements with the energy supplied thereto, so that the life and efficiency of the equipment is enhanced while load demand is controlled. The process apparatus of the invention consists of a digital recycle counter and a switch placed wholly within the control power line of a load. Each process apparatus is customized to the requirements of each individual load and imposes an optimum run operation cycle on its respective load for control and management of demand and operation, so reduced power capacity can be generated at any time with no damage to the equipment, and utility company demand charges are significantly reduced, while the equipment performs at an optimum degree of efficiency, thereby reducing necessary maintenance and repair as well.

7 Claims, 1 Drawing Sheet

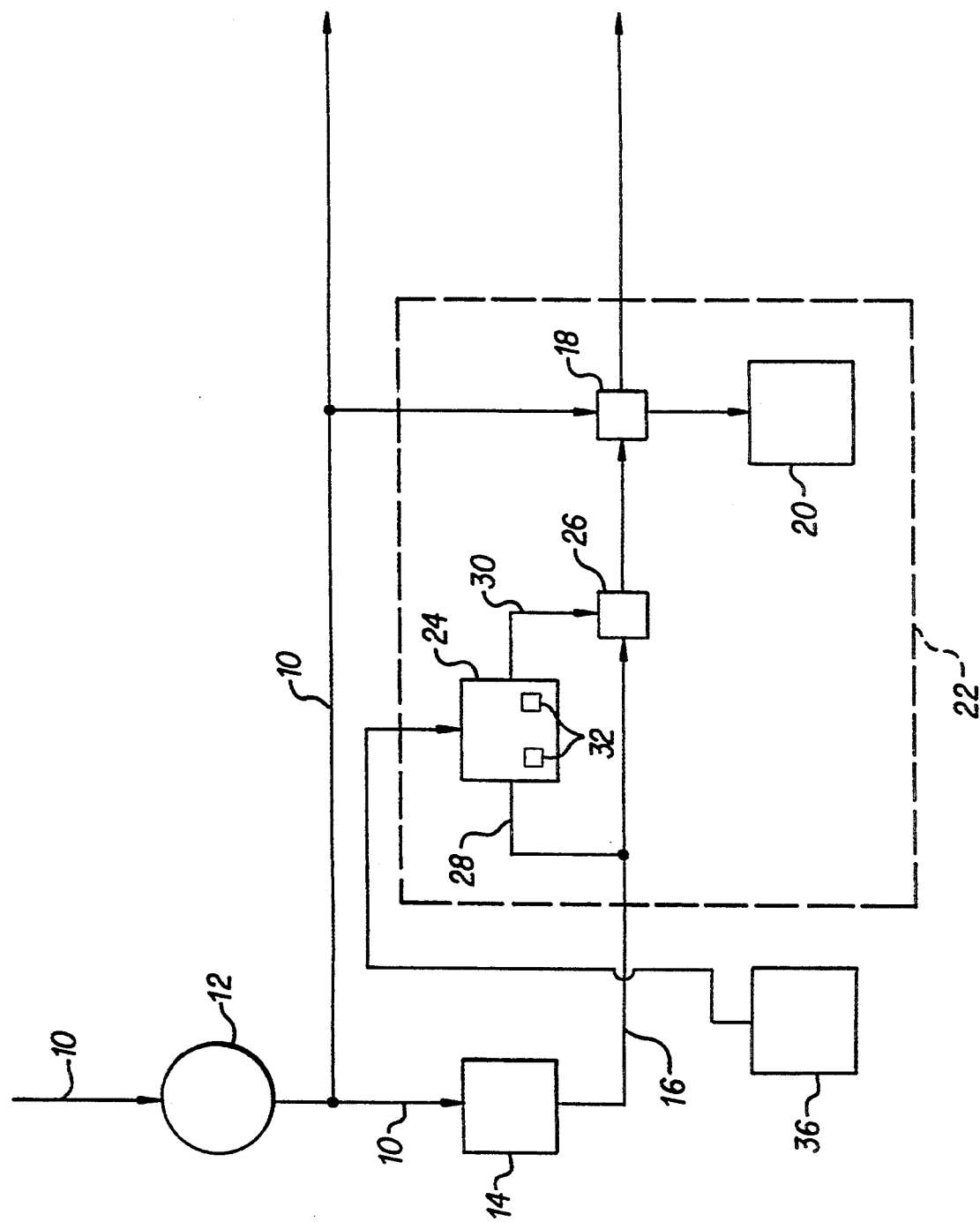

METHOD FOR CONTROLLING AND MANAGING LOAD DEMAND

RELATED APPLICATIONS

This application is a continuation of Ser. No. 07/571,140 filed Aug. 23, 1990, now abandoned, which is a continuation-in-part of Ser. No. 07/316,541, filed Feb. 28, 1989 now abandoned which was a continuation of Ser. No. 07/029,245, filed Mar. 23, 1987, now abandoned.

BACKGROUND OF THE INVENTION

1. Field of the Invention

The present invention relates to a load demand operation control and management process for controlling the load demand and operation of energy-consuming equipment. More particularly, the present invention relates to a control and management process for diverse operations and individual electrical loads of energy-consuming equipment that utilizes unique process apparatus which optimizes the performance of the equipment while precisely controlling and synchronizing the demand of its individual load requirements with the energy supplied thereto, so that the life and efficiency of the equipment is enhanced while load demand is controlled.

2. Background of the Invention

Each electrical utility company supplies power to customers in their respective service area, and at certain daily and seasonal times, customer demand is higher than at other, "off-peak" periods. The basic utility problem is that the company must have sufficient capacity at the "peak" periods to satisfy maximum customer demand or load requirements. The company therefore calculates payment for service based not only upon kilowatt-hours used, but also upon demand (Kw), usually determined by demand readings during short intervals by a company demand meter. The total of kilowatt-hour usage and the highest demand reading over a billing period determine the total charges to the customer. Not surprisingly, the demand charge on an electric utility bill often is the higher of the two costs involved for this service.

There have been many attempts to reduce energy-consuming equipment demand, particularly during "peak" periods, as metered by a utility company, and these previous methods usually involve programmed timers or microprocessors which shut off equipment during a portion of the each metered interval so that demand is reduced and the utility meter reads less demand during that interval. In other words, if a metered demand interval is of a fifteen minute duration and if, during successive fifteen minute intervals, a machine is shut off for some portion of each interval, the reading of the utility meter will reflect a lower demand during each interval, and thus demand charges will be lower.

These known methods and systems, however, do nothing to prevent damage to the equipment and its components from continuous random on/off operation, which contributes to shorter life of the equipment and more frequent necessary maintenance and repair. None of the prior systems or devices take into account the diverse electrical load requirements for the individual components within one piece of equipment. None of the known methods control the equipment in universal synchronization with the electrical energy being supplied, so after a change in the metered interval, such as after a power outage, the timing of these methods may be "out of sync" with the metered demand intervals. The previous methods and systems must use additional devices to preclude the equipment from creating a demand surge or overload by concerted energization after an outage. None of the prior methods or systems precisely control the operation of the equipment so that it functions in an optimum window for the most efficient performance possible. None of the previous methods, systems or devices assist in reducing demand by using no energy at all when not operating, since they must always be energized in order to function, thereby creating their own load demand. In fact, some of the known systems, such as shown in U.S. Pat. No. 4,141,407 to Briscoe et al., may actually allow greater demand by the loads it controls. Briscoe et al. disclose a power demand limiting circuit which utilizes a programmable timer in conjunction with selector switches which turn an air conditioner or heating unit off during some portion of a metered demand interval. If the selector switch is set for control of the air conditioning unit during warm weather, and it turns cold enough one night to fall below the thermostat setting of the uncontrolled heating unit, the heating unit will be activated and run while the air conditioning is also being run, thereby adding load demand, wasting electricity and defeating the purpose of the control.

It can thus be seen that previous systems, methods and devices for load demand reduction are ineffective, and simply "pull the plug" of a machine to reduce its load demand. This may or may not reduce demand. However, none of the previous methods and systems control and manage load demand, and none control and manage the operation of the equipment.

SUMMARY OF THE INVENTION

It is therefore an object of the present invention to provide a superior process for controlling individual load requirements and operation of energy-consuming equipment by imposing a precise optimum operation on the equipment in universal synchronization with the energy being supplied thereto.

An additional object of the invention is to provide unique process apparatus for concertizing and controlling the load requirements of equipment which is simple and inexpensive to manufacture, install and use, and which requires no alteration of the existing equipment or components of the equipment, and which uses no energy unless controlling the load.

A further object of the invention is to provide control and management of load demand requirements and operation which effectively reduces demand through imposed optimum operation of the equipment, thereby reducing demand charges from a utility company supplying energy to the equipment.

Another object of the invention is to impose load demand and operation control on energy-consuming equipment so that all components of the equipment function individually or in concert during optimum periods of operation, without excessive run-on or premature cut-off, thereby extending equipment life and enhancing functional efficiency.

Other objects of the present invention will become obvious from the following specification and claims, and the disclosure of the drawing.

BRIEF DESCRIPTION OF THE DRAWING

The FIGURE is a simple schematic of a circuit diagram which illustrates the process apparatus within the power lines of the equipment with the load to be controlled.

DETAILED DESCRIPTION OF THE DRAWING

With reference to the attached drawing, power lines (10) pass through utility meter (12) at the structure where equipment (22) is located. Meter (12) then meters usage and demand of electrical power at that location. One line, operative power line (10), is left unconditioned, and supplies operative power to equipment (22). A second line (10) passes through a conditioning device (14), such as a transformer, and then functions as a control power line (16), which regulates switch (18) in operative power line (10) in accordance with the signals from the equipment controls. Control power line (16) opens or closes switch (18), thereby breaking or completing the circuit of operative power line (10) and controlling the flow of operative power to load (20) within equipment (22). Only one load (20) is shown in equipment (22) for simplification, but the present invention can also be used with any equipment which have diverse multiple loads. There is also the usual grounding means present, but it is not shown and not a matter of concern in this invention.

The present invention utilizes the process apparatus of a digital recycle counter (24) and a switch (26). The process apparatus is connected in control power line (16) in parallel circuit relationship to operative power line (10) and load (20). At the input (28) of counter (24), the counter receives a flow of electrons from control power line (16). Counter (24) counts the number of pulses in the power frequency and totalizes that number. Upon a particular preset number of totalized pulses, output (30) of counter (24) sends a signal to switch (26) to open or close, thereby breaking or completing the circuit of control power line (16). Thus, the process apparatus of the present invention controls control power line (16), which controls operative power line (10) and the operative power to load (20) of equipment (22).

With the process apparatus of the present invention in the control power line of a device, the operative and inoperative intervals during which the equipment runs or is off is determined solely by counter (24), which complements the controls of the equipment but also overrides the functional necessity of the equipment to fulfill the demands of its controls. In other words, the process apparatus of the present invention imposes control on the load to satisfy the setting of its own controls, but within operation parameters easily met by the equipment. Each counter is custom tailored to the specific needs, function, environment and shortest effective window of operation for each load requirement of the equipment. "Optimum run operation" of one complete off/on cycle is determined for the load, based upon the information above, and the counter is preset for that respective cycle of operation, and for adjustment to an alternate optimum run cycle of operation to further enhance load efficiency. The load is always off during the first preset number of totalized pulses, and a second preset number of totalized pulses governs the on time in which the load operates according to its own control parameters. Additional preset off or on intervals allow for necessary adjustment to an alternate optimum run cycle.

For example, in the normal operation of refrigeration equipment, a compressor, under its own equipment control, runs too long in a dash to satisfy the equipment thermostat, and thus frost builds up on the chilling coils. A defrost period is then necessary to reduce the frost buildup, and electrical resistance heat is employed if ice has formed, since ice or frost on the coils reduce their chilling capacity by preventing direct contact between the air to be chilled and the coils, so the air cannot become as cold as it would if direct coil contact were made. The compressor does not operate during the defrost period, so the temperature of the air rises above the limit setting, and the defrost period is cut short before it has performed its function because the compressor starts. The compressor once again runs too long in an attempt to satisfy the equipment thermostat control, thereby forming ice, so a longer defrost period is needed, and this time the air temperature rises quickly above the thermostat setting, so the defrost period is prematurely cut again and the compressor overruns much too long; the cycle continues to build and worsen. The refrigeration equipment thus becomes inefficient a short period of time into its life span and may require additional maintenance and repair.

Under control of the process apparatus of the present invention, a compressor has an optimum run time imposed upon it, which would be a time less than is necessary to satisfy the thermostat, thereby inhibiting frost buildup. The imposed off time of the optimum run operation cycle would allow the Freon in the compressor system to move heat by conduction and convection to the coldest points of the coils and further inhibit the formation of frost. The compressor would then be cycled on again, providing more chilling through frostless coils, thus gradually satisfying the thermostat with an optimum run operation cycle. This imposed control further reduces the defrost periods necessary because the formation of frost has been initially inhibited. The process apparatus has precluded overrun of the compressor of the refrigeration equipment while also satisfying the requirements of the equipment controls, and thus the efficiency of the equipment could be significantly enhanced. The refrigeration equipment could be cycled for longer on periods during off-peak hours, such as late evening/early morning hours, to build a reserve which could be used during peak periods, thereby allowing the counter to actuate the load for shorter on intervals during peak periods, further enhancing efficiency and controlling demand. This method obtains unequaled results in the control and limit of diverse and individual load demand, since the load does not demand energy throughout the entire period of time which it normally would were it ungoverned by the process apparatus. Additionally, imposed control of the process apparatus prolongs component life and reduces the maintenance and repair necessary to the equipment.

The digital recycle counter (24) employs switches (32) for adjusting the various preset pulse measurement parameters, once the off/on periods of the optimum run operation cycle of the load is determined. Switches (32) may be any suitable configuration for such task, for example dual-in-package (DIP) switches, or shorting caps. For the convenience of the installer, switches (32) may have increments indicated in real time, but this is not really necessary; the increments may also be measurements of totalized pulses. The counter does not employ any real time or any timing device in determining the onset or termination of the optimum run operation cycle off/on intervals. Rather, it counts the number of pulses in the frequency of the power in control power line (16), so the power itself is the only timing base and control of counter (24). In fact, the only time counter (24) is actuated is when the power signal is sent through control line (16) from the equipment controls to actuate load (20). In other words, if no equipment control signal is sent to control power line (16) to actuate switch (18) to energize load (20), counter (24) is not actuated and draws no energy. Thus, counter (24) not only controls the load demand and operation, but also conforms to that objective by not requiring a continuous power supply to function.

Based solely upon the totalized number of pulses, counter (24) determines from the preset parameters of the optimum run cycle of operation when to actuate switch (26). Switch (26) opens or closes accordingly, completing or breaking the circuit of control power line (16) to switch (18). If switch (26) is closed, which it normally is until acted upon by counter (24), the circuit is complete and control power line (16) actuates switch (18) in accordance with the controls of the equipment itself. If switch (26) opens and breaks the circuit of control power line (16), switch (18) cannot be closed and no operative power can be supplied to the load through operative power line (10). It is thus seen that counter (24) imposes a precisely controlled optimum run operation on load (20).

Since both utility meter (12) and counter (24) are AC line synchronized, the imposed control from counter (24) keeps the off/on optimum run cycle of the equipment "in sync" with the meter. If there is an interruption of power, such as an outage, counter (24) and meter (12) naturally both lose power. Upon resumption of power, the preset totalized pulse intervals in counter (24) do not resume where they had been interrupted, but rather, a new off/on optimum run cycle of operation for the controlled load is begun. While meter (12) may start a new demand metering interval, this is not a necessary consideration of counter (24), nor of such import as it is made out to be by other methods and systems. The very fact that the load is cycled off during any portion of the metered interval, where it would not be under its own equipment control, is enough to reduce demand and thereby reduce demand charges from the utility company. Since the load is functioning in a maximum efficient window of operation, it will be controlled by counter (24) to operate a great deal less than it would if it were operating under its own equipment controls, thereby significantly limiting demand. The load would be governed or down sized in demand requirements. Further, the fact that the load is controlled in its operation allows for additional loads to be added to a supposedly maximum load capacity, with no malfunction of equipment and no overload.

Also, upon resumption of power after an interruption or outage, load (20) will not be energized instantly since it is controlled by counter (24), which starts a new off/on optimum run cycle, the first interval being the off interval. There is no need to have a separate time delay, no need for adjustment to the controls of the load, and no need to turn equipment off manually. It is also insured that, upon resumption of power, there is no short cycling of the components of controlled equipment, which can cause damage and inefficient operation. There is no load demand surge created, since no controlled load is energized at the moment of power resumption, nor are any two loads energized at the same time after the cessation of the first off intervals of the respective counters. Each load is individually controlled by its own process apparatus, which is customized to allow an individual off time and an individual on time for its respective load, so different loads would automatically be energized at different times. Particularly important, though, is the fact that, after an outrage, if switches (32) have been adjusted to, for example, an indication of one minute real time, equal to 60 pulses, for a first totalized pulse off interval for load (20), and the utility company can only generate a frequency of 58 pulses during the first real time minute after power resumption, counter (24) will not cycle into a second totalized pulse on interval for load (20) until two pulses past that one minute of real time, or approximately 62 seconds, since it does not recognize the real time increments indicated on switches (32). It recognizes only a precise point of a pulse of the power frequency, and totalizes a sufficient number of those precise points of the pulses to match the preset interval, even if the real time exceeds or falls short of that interval. Thus, if the first interval of off time for a load is indicated as two minutes real time which, for example, equals 120 pulses, and if the utility company exceeds or falls short of 60 pulses per real time minute, the indicated two minutes of real time in the setting of switches (32) does not operate counter (24). If only 110 pulses are generated in the frequency during the first two minutes of real time, counter (24) counts 10 pulses further. If 120 pulses are generated during only one and three-quarter minutes of real time, switches (32) may be set with an indication of two minutes real time, but counter (24) actuates switch (26) after only one and three-quarter minutes real time, according to the totalized pulses. The totalized pulses are the sole basis upon which counter (24) will actuate switch (26). Therefore, load (20) is always synchronized with the power supplied to it, and has a precise control of its load demand imposed upon it by rigid enforcement of its optimum run cycle of operation.

Counter (24) also makes provision for adjustment to an alternate off/on optimum run cycle of operation based upon a contingency for such adjustment from external information. If the equipment or load (20) being controlled is a heat pump and resistance heat, each would have its own counter set to an optimum run cycle of operation which would also complement the operation of the other; the heat pump would operate when the resistance heating unit was off, and vice versa. The counters would receive input from a sensor, such as a temperature sensor (36) located exterior of the structure in which the equipment is housed. When the temperature outside rose sufficiently above a preset limit of the sensor (36), it would inform the counters, such that the resistance heat would be cycled for additional preset off intervals while the counter for the heat pump would cycle the compressor on for additional intervals, also preset. If the sensor (36) input a reading lower than its preset limit to the counters, the resistance heat pump would have additional preset off intervals. Thus, an alternate optimum run cycle of operation is imposed by the counters to gain enhanced efficient use of temperature conditioning equipment such as a heat pump and resistance heat. It is also possible to connect both devices to one counter, with use of a suitable switch, such as a dipole/double throw switch. The on interval would indicate the compressor of the heat pump and the off interval would indicate the resistance heat. In this case, the control of the counter would be exacting, since there would be no possibility of both devices operating at the same time. If the sensor (36) input a higher than preset limit to the counter, the counter would cycle additional on intervals, thereby energizing the heat pump for additional on intervals and adding off intervals to keep the resistance heat inactive. If the sensor (36) input a lower than preset limit reading, the heat pump would be cycled off for additional intervals and the resistance heat would be cycled on during those periods. No other process, system or device known imposes such a precise and efficient load demand and operation control on heat pumps such as the one just described. Thus, the process apparatus also adjusts to an alternate optimum run operation cycle for the load it controls within easy operating parameters of the equipment.

Since the counter operates by totalizing the count of pulses of the frequency of the power, the operation of the unit is precise in its synchronization with the power supplied to it. Since precise control is imposed upon the load to limit it to an optimum run off/on operation cycle, during any demand metering interval the demand of the load or loads of the equipment is greatly reduced, but much more important, all such controlled equipment is in precise synchronization with the power supplied to them, so a reduced electrical capacity can be generated as necessary at any given time from the utility. If the utility company has a problem with a particular plant and must take it off-line, any shift in the pulse of the frequency during the change-over will automatically turn off controlled loads in the respective power lines in which the shift occurs. In fact, the utility company itself can control load demand simply by shifting or altering the waveform of the frequency signal in the power lines to interrupt the present preset interval, whereby counter (24) would automatically start a new optimum run off interval for the respective loads along the lines or over the entire service area. This is the purest demand control and management possible at this time.

The present invention is far superior to any other method or system known. The process apparatus is also very inexpensive to manufacture and easy to install. It requires no alteration of the existing equipment or its working components. It does not preclude the controls of the device itself, but rather complements them, imposing optimum efficient operation well within the operating parameters of the equipment to satisfy the equipment controls. It needs no other component to control and manage year-round demand and operation of a load, and in fact draws no energy when not acted upon by the power signal from the equipment controls. Therefore, the embodiment described in the present application is not to be taken as a limiting disclosure, since endless variations and applications of the present process and process apparatus are envisioned.

What is claimed is:

1. A method for automatically controlling and managing load demand and operation of energy-consuming equipment having individual load requirements using power transmitted through electric power lines from a utility company during all periods when operative power flows including peak demand periods, the improvement comprising the steps of:

predetermining the load requirements for each load and arriving at a predetermined, controlled off-on cycle of operation for the load thus to impose an optimum efficiency operation cycle most suitable for the equipment to perform its function, the load being initiated and operating only in universal synchronization with control power supplied thereto, the off cycle being based on a first preset number of totalized electrical pulses only and being divorced from any real time parameters, the on cycle being based on a second preset number of totalized electrical pulses only and being divorced from any real time parameters;

connecting a separate demand control process apparatus wholly within a control power line at the point of control of each load in parallel relationship to an operative power line supplying operative power to each load, each demand control process apparatus including a control switch operable between open and closed positions to regulate the transmission of control power through the control power line to the load and including a digital recycle counter connected to the control switch to regulate the control switch and operable to retain the control switch open to de-energize the control power to the load for the first preset number of totalized pulses of control power, the first preset number of totalized pulses of the control power being the sole basis of actuation of the recycle counter for the off cycle of operation of the load;

closing the control switch upon the cessation of the first preset number of totalized pulses enabling the control power to energize the load for the second preset number of totalized pulses, the second preset number of totalized pulses of the control power being the sole basis of actuation of the recycle counter for the on cycle of operation of the load, thus to complete a controlled off-on cycle of operation of the load as long as control power flows; and repeating said controlled cycle of operation of the load so long as power flows through the control line;

whereby reduced electrical capacity may be generated because load demand and operation are controlled and managed, resulting in lower utility service charges, higher equipment efficiency and longer equipment life.

2. The method as claimed in claim 1 further comprising the step of additionally regulating the load optimum efficiency operation cycle by connecting the output of a condition sensor in the vicinity of a load to the recycle counter, thus to allow or stop control power flow through the digital recycle counter.

3. The method as claimed in claim 2 further comprising the step of imposing at least two additional predetermined numbers of totalized pulses on the counter thus to further regulate the optimum efficiency operation of equipment.

4. The method as claimed in claim 1 further including the step of the recycle counter not drawing energy from any source until actuated by a flow of electrons through the control power line.

5. The method as claimed in claim 1 further comprising the step of configuring the separate demand control apparatus such that the control switch is normally closed until actuated by the recycle counter.

6. The method as claimed in claim 8 further comprising the steps of automatically controlling and managing multiple loads, predetermining the load requirements for each load and arriving at a predetermined, controlled off-on cycle of operation for each load.

7. The method as claimed in claim 1 wherein equipment includes at least two loads, the further step of configuring and arranging each demand control process apparatus such that a first load is in an on cycle operation mode while the second load is in an off cycle operation mode and the second load is in an on cycle operation mode while the first load is in an off cycle operation mode.

* * * * *

UNITED STATES PATENT AND TRADEMARK OFFICE
CERTIFICATE OF CORRECTION

PATENT NO. : 5,426,620
DATED : June 20, 1995
INVENTOR(S) : Stanley M. Budney

It is certified that error appears in the above-indentified patent and that said Letters Patent is hereby corrected as shown below:

On the title page, item [56], under OTHER PUBLICATIONS change, "SSCA" to --SSAC--.

Column 8, claim 6, line 1, change "8" to --1--.

Signed and Sealed this

Thirteenth Day of August, 1996

Attest:

BRUCE LEHMAN

*Attesting Officer*    *Commissioner of Patents and Trademarks*